United States Patent
Trivedi et al.

(10) Patent No.: US 10,496,966 B2
(45) Date of Patent: *Dec. 3, 2019

(54) SYSTEM AND METHOD OF SOCIAL CASH WITHDRAW

(71) Applicant: Capital One Services, LLC, McLean, VA (US)

(72) Inventors: Dwij Trivedi, Oakton, VA (US); Frank Marcheski, San Francisco, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,720

(22) Filed: Feb. 20, 2019

(65) Prior Publication Data

US 2019/0180254 A1 Jun. 13, 2019

Related U.S. Application Data

(63) Continuation of application No. 14/942,207, filed on Nov. 16, 2015, now Pat. No. 10,217,093.

(Continued)

(51) Int. Cl.
*G06Q 20/10* (2012.01)
*G06Q 20/32* (2012.01)
*G06Q 20/40* (2012.01)

(52) U.S. Cl.
CPC ......... *G06Q 20/10* (2013.01); *G06Q 20/3224* (2013.01); *G06Q 20/40* (2013.01)

(58) Field of Classification Search
CPC ..... G06Q 20/10; G06Q 20/3224; G06Q 20/40
See application file for complete search history.

(56) References Cited

U.S. PATENT DOCUMENTS 7,376,622 B1 * 5/2008 Padalino ............. G06Q 20/108
  705/42
8,065,226 B2 * 11/2011 Rizzo ................... G06Q 20/10
  705/35

(Continued)

FOREIGN PATENT DOCUMENTS

WO   WO-2016014125 A1 * 1/2016 .......... G06Q 20/385
WO      2017025728 A1    2/2017

OTHER PUBLICATIONS

AMSCOT: Cash Advance FAQs, 2013-2018, pp. 1-4 (Year: 2013).*

(Continued)

*Primary Examiner* — Bijendra K Shrestha
(74) *Attorney, Agent, or Firm* — Troutman Sanders LLP; Christopher J. Forstner; John A. Morrissett

(57) ABSTRACT

Systems and methods for locating a cash provider using location-based technologies and transfer funds include receiving a request for cash that includes location data obtained from a location-based technology from a withdrawing party device, searching a network of active providing parties for an available providing party based on withdrawing party preferences and the location data, transmitting an alert to an available providing party device, transmitting available providing party data to withdrawing party if the providing party has confirmed availability, receiving a request to transfer a withdrawal amount from an account associated with the withdrawing party device to an account associated with a selected providing party device, receiving confirmation from the withdrawing party device that the withdrawing party has received cash, transferring the withdrawal amount from the withdrawing party to the selected providing party, and transmitting an alert to the selected providing party device that the withdrawal amount has been transferred.

14 Claims, 6 Drawing Sheets

Related U.S. Application Data

(60) Provisional application No. 62/079,908, filed on Nov. 14, 2014.

(56) References Cited

U.S. PATENT DOCUMENTS

| | | | | |
|---|---|---|---|---|
| 8,463,772 B1* | 6/2013 | Aminzade | ........... | G06F 16/9537 707/723 |
| 8,496,168 B1* | 7/2013 | Miller | ................ | G06Q 20/3221 235/379 |
| 2002/0074394 A1* | 6/2002 | Birnie | .................... | G06Q 20/32 235/379 |
| 2007/0033138 A1* | 2/2007 | Obadan | ................. | G06Q 20/10 705/42 |
| 2010/0114677 A1* | 5/2010 | Carlson | ................. | G06Q 30/02 705/14.1 |
| 2013/0024360 A1 | 1/2013 | Ballout | | |
| 2013/0031009 A1* | 1/2013 | Kapoor | ................. | G06Q 30/06 705/77 |
| 2013/0178233 A1* | 7/2013 | McCoy | ................. | H04W 4/021 455/456.3 |
| 2013/0238497 A1* | 9/2013 | Ramachandran | ...... | G06Q 20/36 705/41 |
| 2014/0263618 A1* | 9/2014 | McCarthy | ............. | G06Q 40/02 235/379 |
| 2014/0374477 A1* | 12/2014 | Korala | .................... | G07F 19/20 235/379 |
| 2016/0012411 A1* | 1/2016 | Kursun | ............. | G06Q 20/3221 705/42 |
| 2016/0078416 A1* | 3/2016 | DeLuca | ............ | G06Q 20/1085 705/43 |

OTHER PUBLICATIONS

Merritt, Cynthia: Mobile Money Transfer Services: The Next Phase in the Evolution in Person-to-Person Payments, Aug. 2010, Federal Reserve Bank of Atlanta, pp. 1-32. (Year: 2010).*

* cited by examiner

SYSTEM AND METHOD OF SOCIAL CASH WITHDRAW

CROSS-REFERENCE TO RELATED APPLICATIONS

This application is a continuation of, and claims priority to, U.S. patent application Ser. No. 14/942,207, filed Nov. 16, 2015, which contains subject matter related to and claims the benefit of U.S. Provisional Patent Application No. 62/079,908, filed on Nov. 14, 2014, the entire contents of which are hereby incorporated by reference.

FIELD OF DISCLOSURE

The present disclosure relates to systems and methods for connecting to a withdrawal system to locate a cash provider using location-based technologies and perform a funds transfer in order to receive a cash withdrawal.

BACKGROUND OF THE DISCLOSURE

With the rise of mobile transactions and transaction card usage, customers often carry little to no currency, or cash. In order to obtain cash, a customer must withdraw cash from one of the several options, including, a bank ATM where the customer has an account, a bank where the customer has an account, an ATM that is not associated with a bank where the customer has an account. However, banks are often only open during regular business hours, banks and bank ATMs may not be located near a customer, lines to use an ATM or transact with a teller may be long, ATMs may charge fees for using them, ATMs may be out-of-order, or a number of factors may make visiting a bank and/or using an ATM inconvenient and undesirable.

These and other drawbacks exist.

SUMMARY OF THE DISCLOSURE

In one example embodiment, the present disclosure is directed to a method for connecting to a withdrawal system to locate a cash provider using location-based technologies and perform a funds transfer in order to receive a cash withdrawal.

The method may include receiving a request for cash from a withdrawing party device, searching a network of active providing parties for an available providing party based on withdrawing party preferences, transmitting an alert to an available providing party device requesting confirmation of availability, transmitting available providing party data to withdrawing party if the providing party has confirmed availability, receiving a request to transfer a withdrawal amount from an account associated with the withdrawing party device to an account associated with a selected providing party device, receiving confirmation from the withdrawing party device that the withdrawing party has received cash in the amount of the withdrawal amount, transferring the withdrawal amount from the account associated with the withdrawing party device to the account associated with the selected providing party device, and transmitting an alert to the selected providing party device that the withdrawal amount has been transferred into the account associated with the selected providing party device. A withdrawing party may include any individual who desires to withdraw cash from a financial account. A providing party may include any party (an individual, a business, or the like) who has cash to provide to the withdrawing party while receiving a transfer of funds from an account associated with the withdrawing party in an account associated with the providing party.

The system and method may include utilizing location-based technologies such as GPS, multilateration of radio signals, network-based location data, device-based technology, Subscriber Identity Module ("SIM")-based data, crowdsourced WiFi data, indoor proximity systems, and/or any combination of the above. Location based technologies may provide location data used to determine available providing parties, provide directions to providing parties, deliver alerts to providing parties when a withdrawing party device is within a certain distance of the providing party location, and the like. Network-based location data may include location data associated with network infrastructure used by a device (e.g., withdrawing party device, providing party device). Device-based technology may include software stored on a device that determines a device location by providing device identification data, signal strength data, IP address data, and the like that may be transmitted to the carrier. SIM-based data may include raw radio measurements including the serving Cell ID, round-trip time, and signal strength. WiFi data, such as crowdsourced WiFi data may include location fingerprinting data, network ID data, signal strength data, and the like. Indoor proximity systems may include devices using Bluetooth technology to communicate with a Bluetooth-enable device when the device is in close proximity to the indoor proximity system. An example of an indoor proximity system may be, for example, an iBeacon.

The systems and methods may include working with a number of application programming interfaces to enable cross-communication between the social withdrawal system and third party systems, such as social networking systems, mapping systems, customer-rating systems, financial institution systems, and the like. For example, a social withdrawal system may desire to use a social networking profile associated with a withdrawing party device to perform a search and determine an available providing party. A social withdrawal system may further desire to transmit directions to the withdrawing party device navigating the withdrawing party to the selected providing party using data received from a mapping system. A social withdrawal system may desire to transmit data received via a rating system API to a withdrawing party device to provide ratings regarding the providing party, such as a Yelp rating or the like. A social withdrawal system may further desire to interact with a number of financial institutions in order to perform the transfer of funds to complete the withdrawal transaction.

The systems and methods may include a financial institution system that maintains an account for both a withdrawing party and a providing party. In this manner, the withdrawal system may be incorporated into or have secure access to the financial institution maintaining the accounts.

The systems and methods may include security profiles for a withdrawing party and/or a providing party. For example, a providing party may maintain a security profile at a withdrawal system to set withdrawal limits for withdrawing parties, withdrawing party ratings (e.g., a credit rating, a rating indicative of a providing party's rating of the withdrawing party which may then be compiled and averaged, and the like), and the like. As another example, a withdrawing party may maintain a security profile at a withdrawal system to indicate a minimal providing party rating, a minimum number of withdrawals taken place with a providing party, and the like.

The systems and methods may include using withdrawing party preferences to search for an available providing party. For example withdrawing party preferences may include, distance preferences (e.g., distance from withdrawing party device to providing party device, time to travel from withdrawing party device to providing party device based on a mode of transportation, and the like), merchant type (e.g., a type of merchant to be the providing party such as a clothing retailer, an electronics retailer, and the like; and/or a specific merchant name to be the providing party, a size of merchant in terms of a number of employees, retail locations, and the like), and/or a discovery preference (e.g., a rating indicating the withdrawing party's preference to discover new merchants).

Each withdrawing party and providing party may maintain a financial account housed at a financial account system. Each financial account may include account information such as account holder name, address, telephone number, email address, account number(s), secondary account holders associated with each account (e.g., a child, a spouse, and the like), related account(s) (e.g., accounts belonging to a child, accounts belonging to a spouse, and the like), account transaction data, and/or account status (e.g., amount of money and/or credit available in an account, payments due to the account, and the like.

These examples are merely illustrative and transactions may be categorized according to any data described herein.

BRIEF DESCRIPTION OF THE DRAWINGS

Various embodiments of the present disclosure, together with further objects and advantages, may best be understood by reference to the following description taken in conjunction with the accompanying drawings, in the several figures of which like reference numerals identify like elements, and in which.

DETAILED DESCRIPTION

Figure 1:
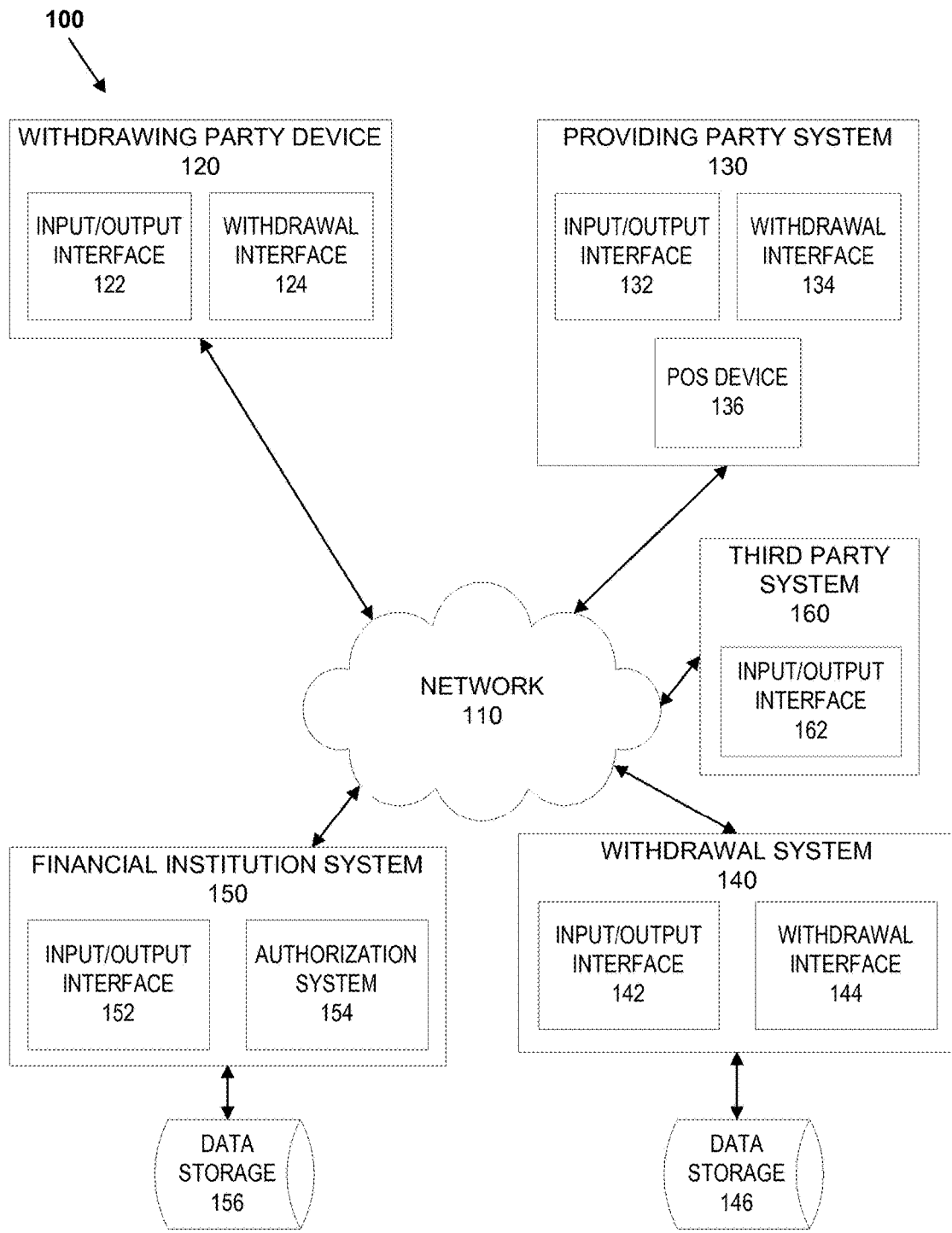
FIG. 1 is a diagram illustrating an example system for providing a cash withdrawal using a social networking platform, consistent with various embodiments.

The following description is intended to convey a thorough understanding of the embodiments described by providing a number of specific example embodiments and details involving systems and methods for connecting to a withdrawal system to locate a cash provider using location-based technologies and perform a funds transfer in order to receive a cash withdrawal. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in various embodiments, depending on specific design and other needs. A financial services institution and systems supporting a financial institution are used in the examples of the disclosure. However, the disclosure is not intended to be limited to financial services institutions only. Instead, the disclosed system and method can be extended to any entity that is able to transfer funds from one account to another. Moreover, a third party withdrawal system is used in the examples of the disclosure. However, the disclosure is not intended to be limit and withdrawal system to a third party system and the withdrawal system may be incorporated within a financial institution system as well. These alterations may be made without departing from the spirit and scope of the disclosure.

According to the various embodiments of the present disclosure, systems and methods are disclosed for enabling automated cash withdrawal using a social networking platform and various electronic devices associated with payment transactions/instruments at the time of withdrawal and transfer of funds. A withdrawal includes providing a withdrawal amount of cash to one party while removing that withdrawal amount from the balance of an account selected for the withdrawal. According to various embodiments of the present disclosure, a withdrawal amount of cash may be given to a withdrawing party by a providing party at a providing party location. The withdrawal amount of cash may then be transferred from an account associated with the withdrawal party to an account associated with the providing party.

A providing party may be determined based on a number of factors including, for example, providing party location, withdrawing party preferences, withdrawing party security preferences, and/or providing party security preferences.

Providing party locations may be stored in data storage associated with a providing party device and/or may be based on location data received from a providing party device and/or a network associated with a providing party. Location data may include data recited from location-based technologies such as GP S data, multilateration of radio signals, network-based location data, device-based technology data, Subscriber Identity Module ("SIM")-based data, crowdsourced WiFi data, indoor proximity system data, and/or any combination of the above. Location based technologies may provide location data used to determine available providing parties, provide directions to providing parties, deliver alerts to providing parties when a withdrawing party device is within a certain distance of the providing party location, and the like. Network-based location data may include location data associated with network infrastructure used by a device (e.g., withdrawing party device, providing party device). Device-based technology may include software stored on a device that determines a device location by providing device identification data, signal strength data, IP address data, and the like that may be transmitted to the carrier. SIM-based data may include raw radio measurements including the serving Cell ID, round-trip time, and signal strength. WiFi data, such as crowdsourced WiFi data may include location fingerprinting data, network ID data, signal strength data, and the like. Indoor proximity systems may include devices using Bluetooth technology to communicate with a Bluetooth-enable device when the device is in close proximity to the indoor proximity system. An example of an indoor proximity system may be, for example, an iBeacon.

Withdrawing party preferences may include, for example, distance preferences (e.g., distance from withdrawing party device to providing party device, time to travel from withdrawing party device to providing party device based on a mode of transportation, and the like), merchant type (e.g., a type of merchant to be the providing party such as a clothing retailer, an electronics retailer, and the like; and/or a specific merchant name to be the providing party, a size of merchant in terms of a number of employees, retail locations, and the like), and/or a discovery preference (e.g., a rating indicating the withdrawing party's preference to discover new merchants).

Withdrawing party security preferences may include, for example, data indicating a minimal providing party rating, a minimum number of withdrawals taken place with a providing party, and the like. Providing party security preferences may include, for example, withdrawal limits for withdrawing parties, withdrawing party ratings (e.g., a credit rating, a rating indicative of a providing party's rating of the withdrawing party which may then be compiled and averaged, and the like), and the like.

The systems and methods depicted in, for example, FIGS. 1 through 7 allow a withdrawing party to receive a cash withdrawal from a providing party according to the withdrawing party and/or providing party preferences in order to provide a social experience for cash withdrawal.

In an example embodiment, the systems and methods of the disclosure may be configured to operate in connection with a withdrawing party device (e.g., a smartphone, an electronic reader, a laptop computer, etc. a set top box, a cable card, etc.) that allows a withdrawing party to transact with a providing party system and/or third party withdrawal system. In an example embodiment, the systems and methods of the disclosure may be configured to operate in connection with a providing party device and/or system (e.g., a point-of-sale ("POS") device, smartphone, an electronic reader, a laptop computer, etc. a set top box, a cable card, etc.) that allows a providing party to transact with a withdrawing party system and/or third party withdrawal system.

The systems and methods may further include one or more corresponding withdrawal system(s) and/or one or more cloud-based services, which may be operated by data service providers, financial institution systems, third party application providers and the like, for example. In the disclosed embodiments, the illustrative data provider may be a financial services institution. The data provider also may be any type of entity that provides data to a user via a user device.

FIG. 1 is a diagram illustrating an example system for providing a cash withdrawal using a social networking platform, according to the various embodiments. As shown in FIG. 1, an example system 100 may include one or more withdrawing party devices 120, one or more providing party systems 130, one or more withdrawal systems 140, financial institution system 150, and/or third party system 160 connected over one or more networks 110.

For example, network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), or a global network such as the Internet. Also network 110 may support an Internet network, a wireless communication network, a cellular network, or the like, or any combination thereof. Network 110 may further include one network, or any number of the example types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Withdrawing party device 120 may be any type of computer, handheld device, and/or transaction card (not pictured). Providing party system 130 may include any type of computer and/or processing system for processing withdrawal-related transactions. Withdrawal system 140 may include a system in having a secure connection to at least one financial institution system, and preferably to multiple financial institution systems, in order to process transfer requests to complete a withdrawal request between a withdrawing party and a providing party. A transfer request may include transferring a withdrawal amount from an account associated with a withdrawing party device 120 to an account associated with a providing party system 130.

Financial institution systems 150 may include systems associated with, for example, a banking service company such as Capital One®, Bank of America®, Citibank®, Wells Fargo®, Sun Trust, various community banks, and the like, as well as a number of other financial institutions such as Visa®, MasterCard®, and AmericanExpress®. Financial institution system 150 may include and/or be connected to one or more computer systems and networks to process transactions. Financial institution system 150 may include systems associated with financial institutions that issue payment cards and maintains a contract with cardholders for repayment. In various embodiments, a financial institution 150 may issue credit, debit, and/or stored value cards, for example. Financial institution 150 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.).

For example, withdrawing party devices 120, providing party systems 130, withdrawal systems 140, financial institution system 150, and/or third party system 160 may include, for example, one or more mobile devices, such as, for example, personal digital assistants (PDA), tablet computers and/or electronic readers (e.g., iPad, Kindle Fire, Playbook, Touchpad, etc.), wearable devices (e.g., Google Glass), telephony devices, smartphones, cameras, music playing devices (e.g., iPod, etc.), televisions, set-top-box devices, and the like.

Withdrawing party devices 120, providing party systems 130, withdrawal systems 140, financial institution system 150, and/or third party system 160 also may include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network.

Withdrawing party devices 120, providing party systems 130, withdrawal systems 140, financial institution system 150, and/or third party system 160 may include at least one central processing unit (CPU), which may be configured to execute computer program instructions to perform various processes and methods. Withdrawing party devices 120, providing party systems 130, withdrawal systems 140, financial institution system 150, and/or third party system 160 may include data storage, including for example, random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

Withdrawing party devices 120, providing party systems 130, withdrawal systems 140, financial institution system 150, and/or third party system 160 may further include, for example, a processor, which may be several processors, a single processor, or a single device having multiple processors. Although depicted as single elements, it should be appreciated that according to one or more embodiments, withdrawing party devices 120, providing party systems 130, withdrawal systems 140, financial institution system 150, and/or third party system 160 may comprise a plurality of withdrawing party devices 120, providing party systems 130, withdrawal systems 140, financial institution systems 150, and/or third party systems 160.

Withdrawing party device 120, providing party system 130, withdrawal system 140, financial institution system 150, and/or third party system 160 may further include data storage (e.g., data storage 146, 156). The data storage may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, or any other storage mechanism.

As shown in FIG. 1, each withdrawing party device 120, providing party system 130, withdrawal system 140, financial institution system 150, and/or third party system 160 may include various components. As used herein, the term "component" may be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device, or may be included in both devices.

Withdrawing party device 120 may include, for example, an input/output interface 122 and/or a withdrawal interface 124. Where, for example, the withdrawing party device 120 is a transaction card, the transaction card may be operable to communicate with a providing party system 130, including a Point of Sale (PoS) device, as described with respect to FIG. 4 below. Input/output interface 122 may enable communication between the components of system 100. Input/output interface 122 may include hardware, software, and/or firmware that may enable communication between withdrawing party device 120, providing party system 130, withdrawal system 140, and/or financial institution 150. For example, input/output interface 122 may include an input/output interface and input/output devices driven by a processor. An input/output device and/or interface may include, for example, a transceiver, modems, network interfaces, buses, CD-ROM, keyboard, mouse, microphone, camera, touch screen, printers, USB flash drives, speakers, and/or any other device configured to receive and transmit electronic data.

Input/output interface 122 may include for example, I/O devices, which may be configured to provide input and/or output to withdrawing party device 120 (e.g., keyboard, mouse, display, speakers, printers, modems, network cards, etc.). Input/output module also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of account holder device 120, and a bus that allows communication among the various components of account holder device 120.

Input/output module may include a display, which may include for example output devices, such as a printer, display screen (e.g., monitor, television, and the like), speakers, projector, and the like. Although not shown, each account holder device 120 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Withdrawal interface 124 may include hardware and/or software to enable withdrawal methods as described with reference to, for example, FIGS. 2 through 7. For example, withdrawal interface 124 may include at least one processor configured to request a search for an available providing party, request a specific providing party, and/or request a withdrawal amount from a providing party. Withdrawal interface 124 may include at least one processor configured to transmit and/or receive data and/or a withdrawal result from a withdrawal system 130 where a withdrawal result may include, a listing of available providing parties, a map and/or directions to available providing parties, and/or rating information for available providing parties.

Providing party system 130 may include, among other components, an input/output interface 132, a withdrawal interface 134, and/or a PoS device 136. Input/output interface 132 may include for example, I/O devices, which may be configured to provide input and/or output to providing party system 130 (e.g., keyboard, mouse, display, speakers, printers, modems, network cards, etc.). Input/output interface 132 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of providing party system 130, and a bus that allows communication among the various components of providing party system 130. Input/output interface 132 may include a display, which may include for example output devices, such as a printer, display screen (e.g., monitor, television, and the like), speakers, projector, and the like. Although not shown, each providing party system 130 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Withdrawal interface 134 may include hardware and/or software to enable withdrawal methods as described with reference to FIGS. 2 through 7. For example, withdrawal interface 134 may include at least one processor configured to receive a request to be an available providing party, confirm a withdrawal amount given to a withdrawing party, and request a transfer of a withdrawal amount from a withdrawal system and/or financial institution. Withdrawal interface 134 may include at least one processor configured to transmit and/or receive data and/or a withdrawal result from a withdrawing party device 120 and/or financial institution 140 where a withdrawal result may include, a listing of requesting withdrawing parties, confirmation of a cash withdrawal, information regarding withdrawing party profile data, and/or rating information for requesting withdrawing parties.

PoS device 136 may include a variety of readers to read transaction data associated with a transaction taking place with a merchant and/or providing party 130. PoS device 136 may include various hardware and/or software components required to conduct and process transaction, such as components described throughout, for example, FIGS. 2, 3, and 4. Providing party system 130 may also include data storage (not shown) to store transaction data and/or approval of charges between an account holder and the merchant associated Withdrawal system 140 may include various software and/or hardware components operable to perform the categorization methods according to FIG. 5. For example, categorization system may include software and/or hardware components operable to enable input/output interface 142 and withdrawal interface 144. Input/output interface 142 may enable communication between components of system 100. Input/output interface 142 may enable secure communications with one or more financial institution systems 150 and/or third party system 160, which may include using various application programming interfaces (APIs) associated with the financial institution systems 150 and/or third party systems 160 in order to receive transaction data associated with an account holder.

An input/output device and/or interface may include, for example, a transceiver, modems, network interfaces, buses, CD-ROM, keyboard, mouse, microphone, camera, touch screen, printers, USB flash drives, speakers, and/or any other device configured to receive and transmit electronic data. Input/output interface 142 may include for example, I/O devices, which may be configured to provide input and/or output to and/or from withdrawal system 140 (e.g., keyboard, mouse, display, speakers, printers, modems, network cards, etc.). Input/output interface 142 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of withdrawal system 140, and a bus that allows communication among the various components of withdrawal system 140. Input/output interface 142 may include a display, which may include for example output devices, such as a printer, display screen (e.g., monitor, television, and the like), speakers, projector, and the like. Although not shown, withdrawal system 140 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like. Withdrawal interface 144 may include various software and/or hardware component to enable the searching for available providing parties and/or coordination of withdrawal transfers according to FIG. 5.

Financial institution system 150 may include various software and/or hardware components operable to enable an input/output interface 152 and/or an authorization system 154. Input/output interface 152 may include may enable communication between the components of system 100. Input/output interface 152 may include hardware, software, and/or firmware that may enable communication between, for example, withdrawal system 140, providing party system 130, and/or withdrawing party device 120. For example, input/output interface 152 may include an input/output interface and input/output devices driven by a processor. An input/output device and/or interface may include, for example, a transceiver, modems, network interfaces, buses, CD-ROM, keyboard, mouse, microphone, camera, touch screen, printers, USB flash drives, speakers, and/or any other device configured to receive and transmit electronic data. Input/output interface 152 may include for example, I/O devices, which may be configured to provide input and/or to and/or from financial institution system 150 (e.g., keyboard, mouse, display, speakers, printers, modems, network cards, etc.). Input/output interface 152 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of financial institution system 150, and a bus that allows communication among the various components of financial institution system 150. Input/output interface 152 may include a display, which may include for example output devices, such as a printer, display screen (e.g., monitor, television, and the like), speakers, projector, and the like. Although not shown, financial institution system 150 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

Authorization system 154 may include at least one processor and data storage 156 required to authorize and approve a transaction and/or communicate with various external systems in order to authorize and approve a transaction. For example, transaction approval may occur as describe herein with respect to FIGS. 2 through 4.

Third party system 160 may include at least an input/output module 162 and/or data storage (not shown) storing third party system data. A third party system 160 may include a social media system, such as a system associated with Facebook, Twitter, Instagram, Pinterest, and the like; a rating system, such as a system associated with Yelp, CitySearch, Angie's List, and the like; a mapping system, such as a system associated with Google Maps, Apple Maps, and the like; and/or any other third party providing data used in providing information about withdrawing and/or providing parties for use through the methods described in FIGS. 5-7.

Input/output module 162 may include for example, I/O devices, which may be configured to provide input and/or output to third party system 160 (e.g., keyboard, mouse, display, speakers, printers, modems, network cards, etc.). Input/output module 162 also may include antennas, network interfaces that may provide or enable wireless and/or wire line digital and/or analog interface to one or more networks, such as network 110, over one or more network connections, a power source that provides an appropriate alternating current (AC) or direct current (DC) to power one or more components of third party system 160, and a bus that allows communication among the various components of third party system 160. Input/output module 162 may include a display, which may include for example output devices, such as a printer, display screen (e.g., monitor, television, and the like), speakers, projector, and the like. Although not shown, each third party system 160 may include one or more encoders and/or decoders, one or more interleavers, one or more circular buffers, one or more multiplexers and/or de-multiplexers, one or more permuters and/or depermuters, one or more encryption and/or decryption units, one or more modulation and/or demodulation units, one or more arithmetic logic units and/or their constituent parts, and the like.

In one or more implementations of the components of FIG. 1, the functions described may be implemented in hardware, software, firmware, or any combination thereof. If implemented in software, the functions may be stored as one or more instructions or code on computer-readable medium, including the computer-readable medium described above (e.g., RAM, ROM, storage media, and the like).

Although FIG. 1 depicts withdrawing party device 120, providing party system 130, withdrawal system 140, financial institution system 150, and/or third party system 160 communicating with one another using an indirect network connection, such as a connection through network 110, those skilled in the art may appreciate that withdrawing party device 120, providing party system 130, withdrawal system 140, financial institution system 150, and/or third party system 160 may communicate with one another and similar devices using a direct communications link or a communications link separate from network 110. For example, withdrawing party device 120, providing party system 130, withdrawal system 140, financial institution system 150, and/or third party system 160 may communicate with one another via point-to-point connections (e.g., Bluetooth connections, etc.), peer-to-peer connections, and the like. By way of example, withdrawing party device 120, providing party system 130, withdrawal system 140, financial institution system 150, and/or third party system 160 may communicate with one another via mobile contactless communication and/data transfers, remote electronic communication and/data transfers, magnetic stripe communication and/data transfers, secure chip technology communication and/data transfers, person-to-person communication and/data transfers, and the like. Additionally, withdrawing party device 120, providing party system 130, withdrawal system 140, financial institution system 150, and/or third party system 160 may communicate with one another utilizing standardized transmission protocols, for example and not by way of limitation, ISO/IEC 14443 A/B, ISO/IEC 18092, MiFare, FeliCa, tag/smartcard emulation, and the like. Also withdrawing party device 120, providing party system 130, withdrawal system 140, financial institution system 150, and/or third party system 160 may communicate with one another utilizing transmission protocols and methods that are developed in the future using other frequencies or modes of transmission. Withdrawing party device 120, providing party system 130, withdrawal system 140, financial institution system 150, and/or third party system 160 may communicate with one another via existing communication and/data transfer techniques, such as, for example RFID. Also, withdrawing party device 120, providing party system 130, withdrawal system 140, financial institution system 150, and/or third party system 160 may communicate with one another via new and evolving communication and/data transfer standards including internet-based transmission triggered by near-field communications (NFC).

In the embodiment of FIG. 1, withdrawing party device 120, providing party system 130, withdrawal system 140, financial institution system 150, and/or third party system 160 may communicate using standard Internet Protocols, such as HTTP and/or HTTPS, transmission control protocol (TCP), internet protocol (IP), etc. For example, HTTPS requests withdrawing party device 120, providing party system 130, withdrawal system 140, financial institution system 150, and/or third party system 160 may be encapsulated in TCP segments, IP datagrams, and Ethernet frames and transmitted to withdrawing party device 120, providing party system 130, withdrawal system 140, financial institution system 150, and/or third party system 160. Third parties, for example, may participate as intermediaries in the communication, such as, for example, Internet Service Providers (ISPs) or other entities that provide routers and link layer switches. Such third parties may not, however, analyze or review the contents of the Ethernet frames beyond the link layer and the network layer, but instead analyze only those parts of the packet necessary to route communications among and between from withdrawing party device 120, providing party system 130, withdrawal system 140, financial institution system 150, and/or third party system 160.

Figure 2:
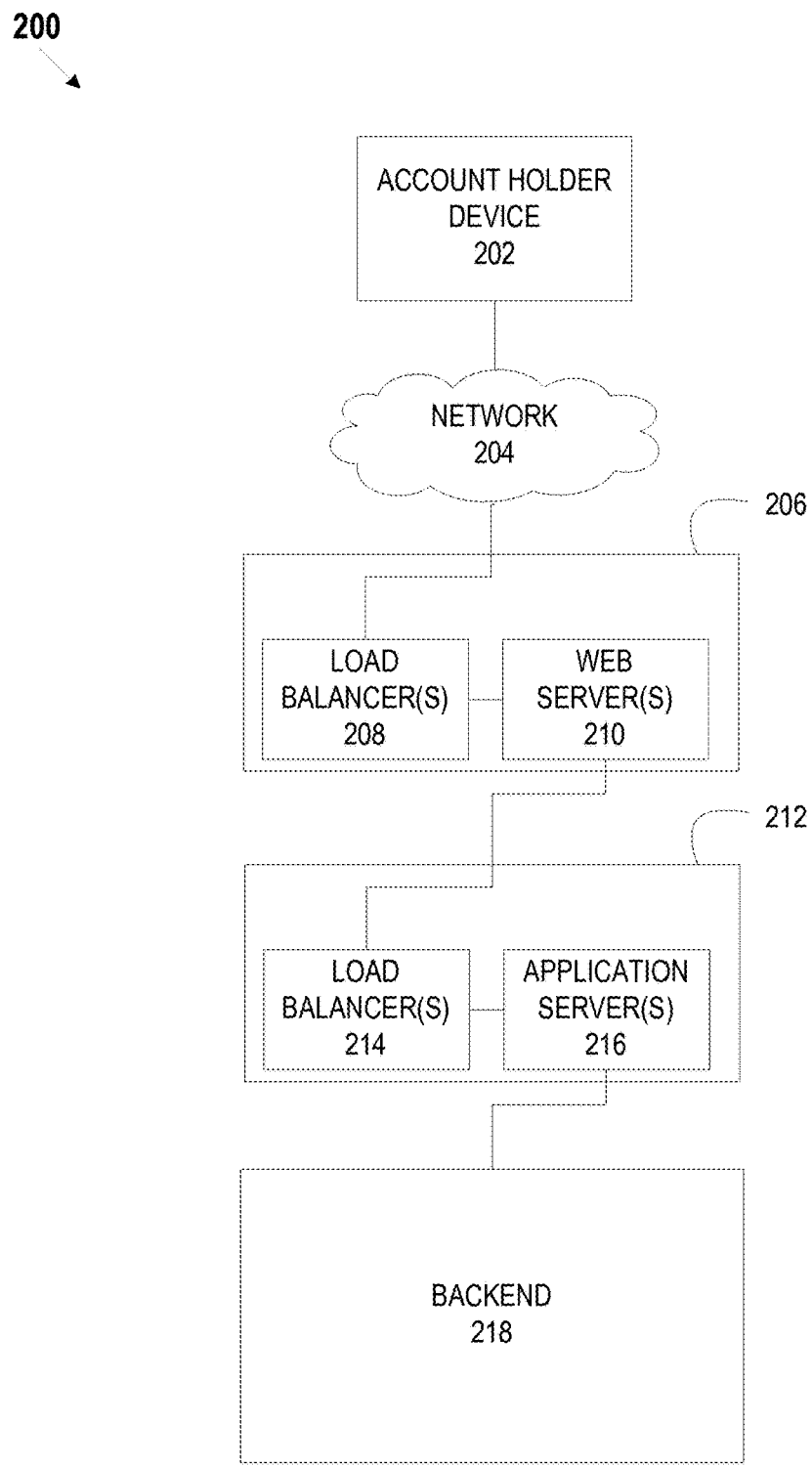
FIG. 2 is a diagram illustrating an example system for providing a cash withdrawal using a social networking platform, consistent with various embodiments.

FIG. 2 depicts an example system used providing cash withdrawal using a social networking platform, according to various embodiments. The example system 200 in FIG. 2 may enable a financial institution and/or withdrawal system, for example, to provide network services to its account holders, such as withdrawing and/or providing parties. As shown in FIG. 2, system 200 may include an account holder device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

Account holder device 202, such as a device used by a withdrawing party or a providing party, may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

Account holder device 202 also may be a mobile device. For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device. Account holder device 202 also may be similar to withdrawing party device 120 and/or providing party system 130 as shown and described in FIG. 1.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to provide security for backend 218. Load balancer(s) 208 may distribute workloads across multiple computing resources, such as, for example computers, a computer cluster, network links, central processing units or disk drives. In various embodiments, load balancer(s) 210 may distribute workloads across, for example, web server(S) 216 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, account holder device 202, connect to access various services of a financial institution, for example. Load balancer(s) 208 may forward requests to one of the application servers 216 and/or backend 218 servers, which may then reply to load balancer 208. This may allow load balancer(s) 208 to reply to account holder device 202 without account holder device 202 ever knowing about the internal separation of functions. It also may prevent account holder devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP/HTTPS compression; TCP offloading; TCP buffering; direct server return; health checking; HTTP/HTTPS caching; content filtering; HTTP/HTTPS security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., account holder device 202) through a network (e.g., network 204), such as the Internet.

In various examples, web servers, may deliver web pages, relating to, for example, online banking applications and the like, to clients (e.g., account holder device 202). Web server(s) 210 may use, for example, a hypertext transfer protocol (HTTP/HTTPS or sHTTP) to communicate with account holder device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP/HTTPS and web server 210 may respond with the content of that resource or an error message if unable to do so. The resource may be, for example a file on stored on backend 218. Web server(s) 210 also may enable or facilitate receiving content from account holder device 202 so account holder device 202 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution, categorization company, or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 218 on one side, and, connections to the Web client (e.g., client device 202) on the other.

Backend 218 may include hardware and/or software that enables the backend services of, for example, a financial institution, a withdrawal provider, and/or a third party provider, or other entity that maintains a distributed system similar to system 200. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, a transaction categorization system, which may include additional capabilities, such as budget management, and the like. Backend 218 may be associated with various databases, including account databases that maintain, for example, account holder information (e.g., withdrawing party preferences, providing party security preferences, withdrawing party security preferences, and the like), transaction databases that maintain transaction data, including withdrawal data, product databases that maintain information about products and services available to customers, content databases that store content associated with, for example, a financial institution, and the like. Backend 218 also may be associated with one or more servers that enable the various services provided by system 200. Backend 218 may enable a financial institution and/or a withdrawal provider, for example, to implement the cash withdrawal using a social networking platform methods as shown and described herein.

Figure 3:
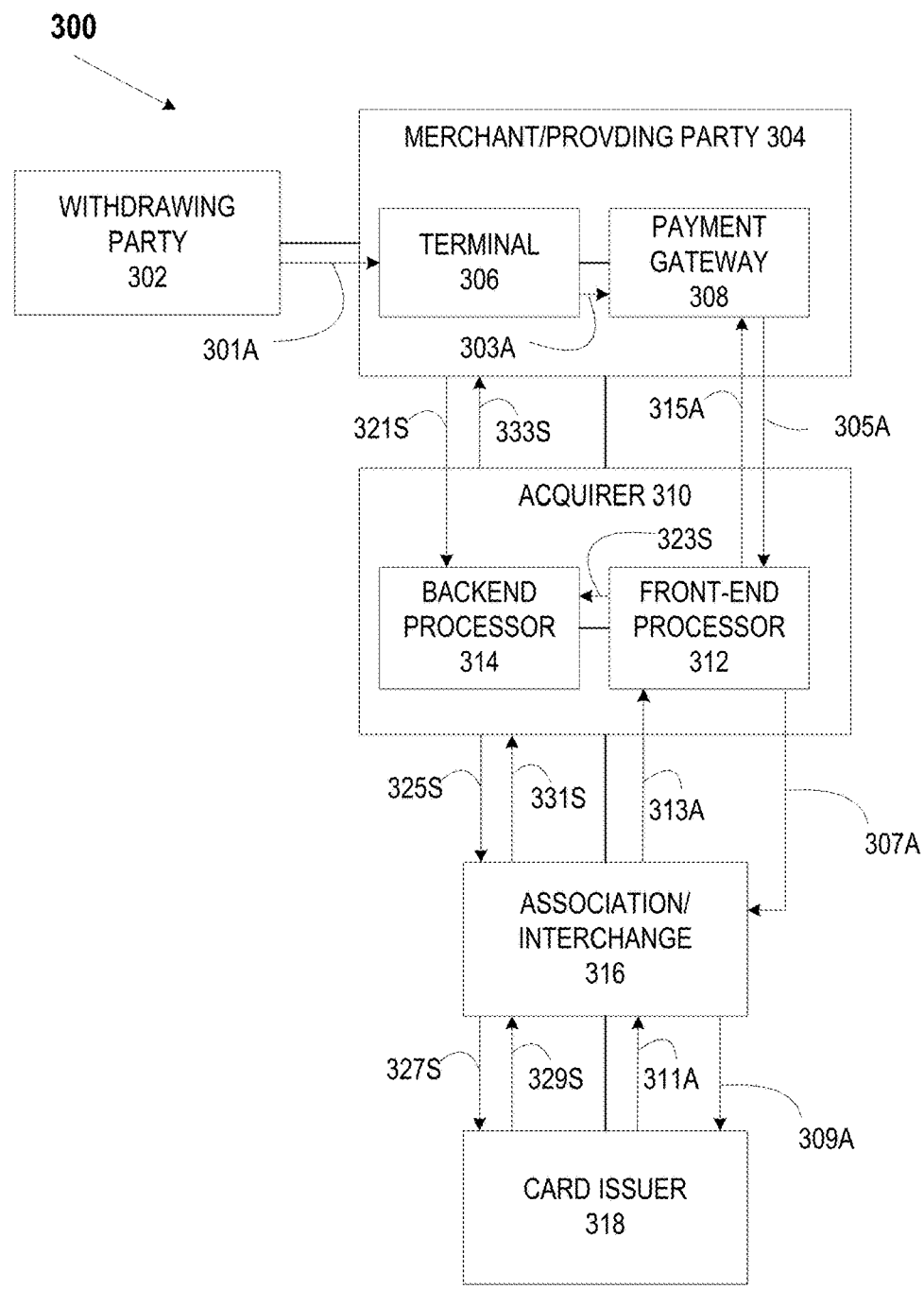
FIG. 3 is a diagram illustrating an example system providing a cash withdrawal using a social networking platform, consistent with various embodiments.

FIG. 3 illustrates an example system 300 and method for transaction authorization. As shown and described in FIG. 3, account holders, such as withdrawing parties and/or providing parties, and financial institutions may be connected with a card association network to enable secure transactions, timely payments, and successful withdrawals. System 300 may include a cardholder 302, merchant 304, Acquirer 310, Association/Interchange 316, and card issuer 318.

Withdrawing party 302 may be any withdrawing party and/or account holder, including a credit card holder, debit card holder, stored value card holder and the like. Withdrawing party 302 may be similar to the withdrawing party associated with withdrawing party device 120. Withdrawing party 302 may possess a plastic card or carry a device (e.g., a mobile device) that securely stores card credentials and is capable of transmitting the card credentials to, for example, a PoS terminal (e.g., terminal 306) and/or an input/output module. Withdrawing party 302 may interact with a merchant and/or a providing party (e.g., merchant 304) by presenting a card or card credentials to a terminal (e.g., terminal 306).

Merchant 304 may be any merchant that accepts payment from a cardholder in exchange for a cash withdrawal, for example. Merchant 304 may be any retailer, service provider, business entity, or individual that accepts payments. Merchant 304 may include software, firmware and hardware for accepting and/or processing payments. For example, as illustrated in FIG. 3, merchant 304 may include a terminal 306 and a payment gateway 308. Terminal 306 and payment gateway 308 may comprise the physical or virtual device(s) used by merchant 304 to communicate information to front-end processor 312 of acquirer 310. Terminal 306 may be similar to a PoS system. In various embodiments, payment gateway 308 may be an e-commerce application service provider service that authorizes payments for merchants. As such, payment gateway 308 may be a virtual equivalent of a PoS terminal and interface with, for example, a billing system of merchant 304 and pass data to front-end processor 312 of acquirer 310.

Acquirer 310 may be, for example, a financial institution or bank that holds the contract for providing payment processing services to merchant 304. Merchant 304 may have a merchant account that may serve as a contract under which Acquirer 310 may extend a line of credit to a merchant who wishes to accept, for example, credit card transactions. As shown in FIG. 3, Acquirer 310 may be associated with front-end processor 312 and back-end processor 314.

In various examples, front-end processor 312 may be a platform that card terminal 306 and/or payment gateway 308 communicate with when approving a transaction and/or withdrawal. Front-end processor 312 may include hardware, firmware, and software to process transactions and/or withdrawals. Front-end processor 312 may be responsible for the authorization and capture portion of credit card transaction. Front-end processor 312 also may include additional front-end platform interconnections to support, for example, ACH and debit transactions.

Backend processor 314 may be a platform that takes captured transactions from front-end processor 312 and settles them through an Interchange system (e.g., association/interchange 316). Back-end processor 314 may generate, for example, daily ACH files for merchant settlement. Back-end processor 314 also may handle chargeback handling, retrieval request and monthly statements.

Association/interchange 316 may be the consumer payment system whose members are the financial institutions that issue payment cards and/or sign merchant to accept payment cards. Example associations/interchanges 316 may include, Visa®, MasterCard®, and American Express®. Association/interchange 316 may include one or more computer systems and networks to process transactions.

Issuer 318 may be a financial institution that issues payment cards and maintains a contract with cardholders for repayment. In various embodiments, issuer 318 may issue credit, debit, and/or stored value cards, for example. Example issuers may include, Capital One®, Bank of America®, Citibank®, Sun Trust®, and the like.

In various embodiments, processing a payment card transaction and/or withdrawal may involve two stages: (1) authorization and (2) clearing and settlement. Authorization may refer to an electronic request that is sent through various parties to either approve or decline the transaction. Clearing and Settlement may refer to settlement of the parties' settle accounts to enable the parties to get paid.

During authorization, cardholder 302 may present payment card as payment (301A) at merchant 304 PoS terminal 306, for example. Merchant 304 may enter card into a physical PoS terminal 306 or submit a credit card transaction to a payment gateway 308 on behalf of withdrawing party 302 via secure connection from a Web site, retail location, or a wireless device.

Payment gateway 308 may receive the secure transaction information (303A) and may pass the secure transaction information and/or withdrawal information (305A) via a secure connection to the merchant acquirer's 310 front-end processor 312.

Front-end processor 312 may submit the transaction and/or withdrawal request (307A) to association/interchange 316 (e.g., a network of financial entities that communicate to manage the processing, clearing and settlement of credit card transactions). Association/interchange 316 may route the transaction and/or withdrawal request (309A) to the customer's Issuer 318. Issuer 318 may approve or decline the transaction and/or withdrawal and passes the transaction and/or withdrawal results back (311A) through association/interchange 316. Association/interchange then may relay the transaction and/or withdrawal results (313A) to front-end processor 312.

Front-end processor 312 may relay the transaction results (315A) back to the payment gateway 308 and/or terminal 306. Payment gateway 308 may store the transaction and/or withdrawal results and sends them to merchant 304. Merchant 304 may receive the authorization response and complete the transaction and/or withdrawal accordingly.

During settlement, merchant 304 may deposit the transaction and/or withdrawal receipt (321S) with acquirer 310 via, for example, a settlement batch. Captured authorizations may be passed (323S) from front-end processor 312 to the back-end processor 314 for settlement. Back-end processor may generate ACH files for merchant settlement. Acquirer may submit settlement files (325S, 327S) to Issuer 318 for reimbursement via association/interchange 316. Issuer 318 may post the transaction and/or withdrawal and pay merchant 304 (329S, 331S, 333S).

Figure 4:
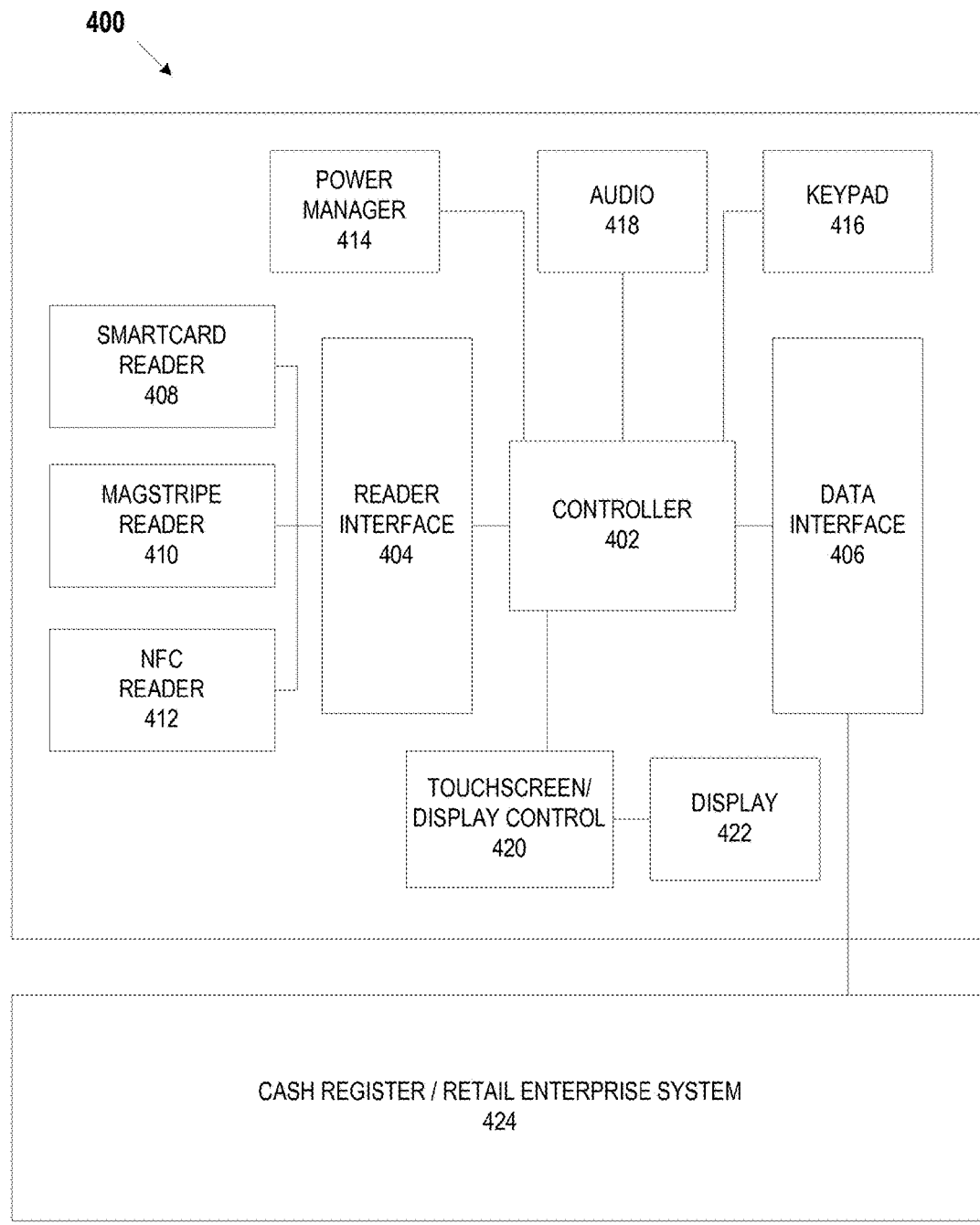
FIG. 4 is a diagram illustrating an example system for providing a cash withdrawal using a social networking platform, consistent with various embodiments.

With respect to a merchant and a PoS device, FIG. 4 illustrates an example PoS device 400. PoS device 400 may include a controller 402, a reader interface 404, a data interface 406, a smartcard reader 408, a magnetic stripe reader 410, a near-field communications (NFC) reader 412, a power manager 414, a keypad 416, an audio interface 418, a touchscreen/display controller 420, and a display 422. Also, PoS device 400 may be coupled with, integrated into or otherwise connected with a cash register/retail enterprise system 424.

In various embodiments, Controller 402 may be any controller or processor capable of controlling the operations of PoS device 400. For example, controller 402 may be an Intel® 2nd Generation Core™ i3 or i5 or Pentium™ G850 processor or the like. Controller 402 also may be a controller included in a personal computer, smartphone device, tablet PC or the like.

Reader interface 404 may provide an interface between the various reader devices associated with PoS device 400 and PoS device 400. For example, reader interface 404 may provide an interface between smartcard reader 408, magnetic stripe reader 410, NFC reader 412 and controller 402. In various embodiments, reader interface 404 may be a wired interface such as a USB, RS232 or RS485 interface and the like. Reader interface 404 also may be a wireless interface and implement technologies such as Bluetooth, the 802.11(x) wireless specifications and the like. Reader interface 404 may enable communication of information read by the various reader devices from the various reader devices to PoS device 400 to enable transactions. For example, reader interface 404 may enable communication of a credit or debit card number read by a reader device from that device to PoS device 400. In various embodiments, reader interface 404 may interface between PoS device 400 and other devices that do not necessarily "read" information but instead receive information from other devices.

Data interface 406 may allow PoS device 400 to pass communicate data throughout PoS device and with other devices including, for example, cash register/retail enterprise system 424. Data interface 406 may enable PoS device 400 to integrate with various customer resource management (CRM) and/or enterprise resource management (ERP) systems. Data interface 406 may include hardware, firmware and software that make aspects of data interface 406 a wired interface. Data interface 406 also may include hardware, firmware and software that make aspects of data interface 606 a wireless interface. In various embodiments, data interface 406 also enables communication between PoS device other devices.

Smartcard reader 408 may be any electronic data input device that reads data from a smart card. Smartcard reader 408 may be capable of supplying an integrated circuit on the smart card with electricity and communicating with the smart card via protocols, thereby enabling read and write functions. In various embodiments, smartcard reader 408 may enable reading from contact or contactless smart cards. Smartcard reader 408 also may communicate using standard protocols including ISO/IEC 7816, ISO/IEC 14443 and/or the like or proprietary protocols.

Magnetic stripe reader 410 may be any electronic data input device that reads data from a magnetic stripe on a credit or debit card, for example. In various embodiments, magnetic stripe reader 410 may include a magnetic reading head capable of reading information from a magnetic stripe. Magnetic stripe reader 410 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments.

NFC reader 412 may be any electronic data input device that reads data from a NFC device. In an exemplary embodiment, NFC reader 412 may enable Industry Standard NFC Payment Transmission. For example, the NFC reader 412 may communicate with a NFC enabled device to enable two loop antennas to form an air-core transformer when placed near one another by using magnetic induction. NFC reader 412 may operate at 13.56 MHz or any other acceptable frequency. Also, NFC reader 412 may enable a passive communication mode, where an initiator device provides a carrier field, permitting answers by the target device via modulation of existing fields. Additionally, NFC reader 412 also may enable an active communication mode by allowing alternate field generation by the initiator and target devices.

In various embodiments, NFC reader 412 may deactivate an RF field while awaiting data. NFC reader 412 may receive communications containing Miller-type coding with varying modulations, including 100% modulation. NFC reader 412 also may receive communications containing Manchester coding with varying modulations, including a modulation ratio of approximately 10%, for example. Additionally, NFC reader 412 may be capable of receiving and transmitting data at the same time, as well as checking for potential collisions when the transmitted signal and received signal frequencies differ.

NFC reader 412 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 412 may be able to utilize transmission protocols and methods that are developed in the future using other frequencies or modes of transmission. NFC reader 412 also may be backwards-compatible with existing payment techniques, such as, for example RFID. Also, NFC reader 412 may support transmission requirements to meet new and evolving payment standards including internet based transmission triggered by NFC. In various embodiments, NFC reader 412 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 414 may be any microcontroller or integrated circuit that governs power functions of PoS device 400. Power manager 414 may include, for example, firmware, software, memory, a CPU, a CPU, input/output functions, timers to measure intervals of time, as well as analog to digital converters to measure the voltages of the main battery or power source of PoS device 400. In various embodiments, Power manager 414 remains active even when PoS device 400 is completely shut down, unused, and/or powered by the backup battery. Power manager 414 may be responsible for coordinating many functions, including, for example, monitoring power connections and battery charges, charging batteries when necessary, controlling power to other integrated circuits within PoS device 400 and/or other peripherals and/or readers, shutting down unnecessary system components when they are left idle, controlling sleep and power functions (on and off), managing the interface for built-in keypad and trackpads, and/or regulating a real-time clock (RTC).

Keypad 416 may any input device that includes a set of buttons arranged, for example, in a block or pad and may bear digits, symbols and/or alphabetical letters. Keypad 416 may be a hardware-based or mechanical-type keypad and/or implemented in software and displayed on, for example, a screen or touch screen to form a keypad. Keypad 416 may receive input from a user that pushed or otherwise activates one or more buttons on keypad 416 to provide input.

Audio interface 418 may be any device capable of providing audio signals from PoS device 400. For example, audio interface may be a speaker or speakers that may produce audio signals. In various embodiments, audio interface 418 may be integrated within PoS device 400. Audio interface 418 also may include components that are external to PoS device 400.

Touchscreen/display control 420 may be any device or controller that controls an electronic visual display. Touchscreen/display control 420 may allow a user to interact with PoS device 400 through simple or multi-touch gestures by touching a screen or display (e.g., display 422). Touchscreen/display control 420 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 420 may receive inputs from the touchscreen and process the received inputs. Touchscreen/display control 420 also may control the display on PoS device 400, thereby providing the graphical user interface on a display to a user of PoS device 400.

Display 422 may be any display suitable for a PoS device. For example, display 422 may be a TFT, LCD, LED or other display. Display 422 also may be a touchscreen display that for example allows a user to interact with PoS device 400 through simple or multi-touch gestures by touching a screen or display (e.g., display 422). Display 422 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 422 may receive inputs from control gestures provided by a user. Display 422 also may display images, thereby providing the graphical user interface to a user of PoS device 400.

Cash register/retail enterprise system 424 may me any device or devices that cooperate with PoS device 400 to process transactions. Cash register/retail enterprise system 424 may be coupled with other components of PoS device 400 via, for example, a data interface (e.g., data interface 406) as illustrated in FIG. 4. Cash register/retail enterprise system 424 also may be integrated into PoS device 400.

Figure 5:
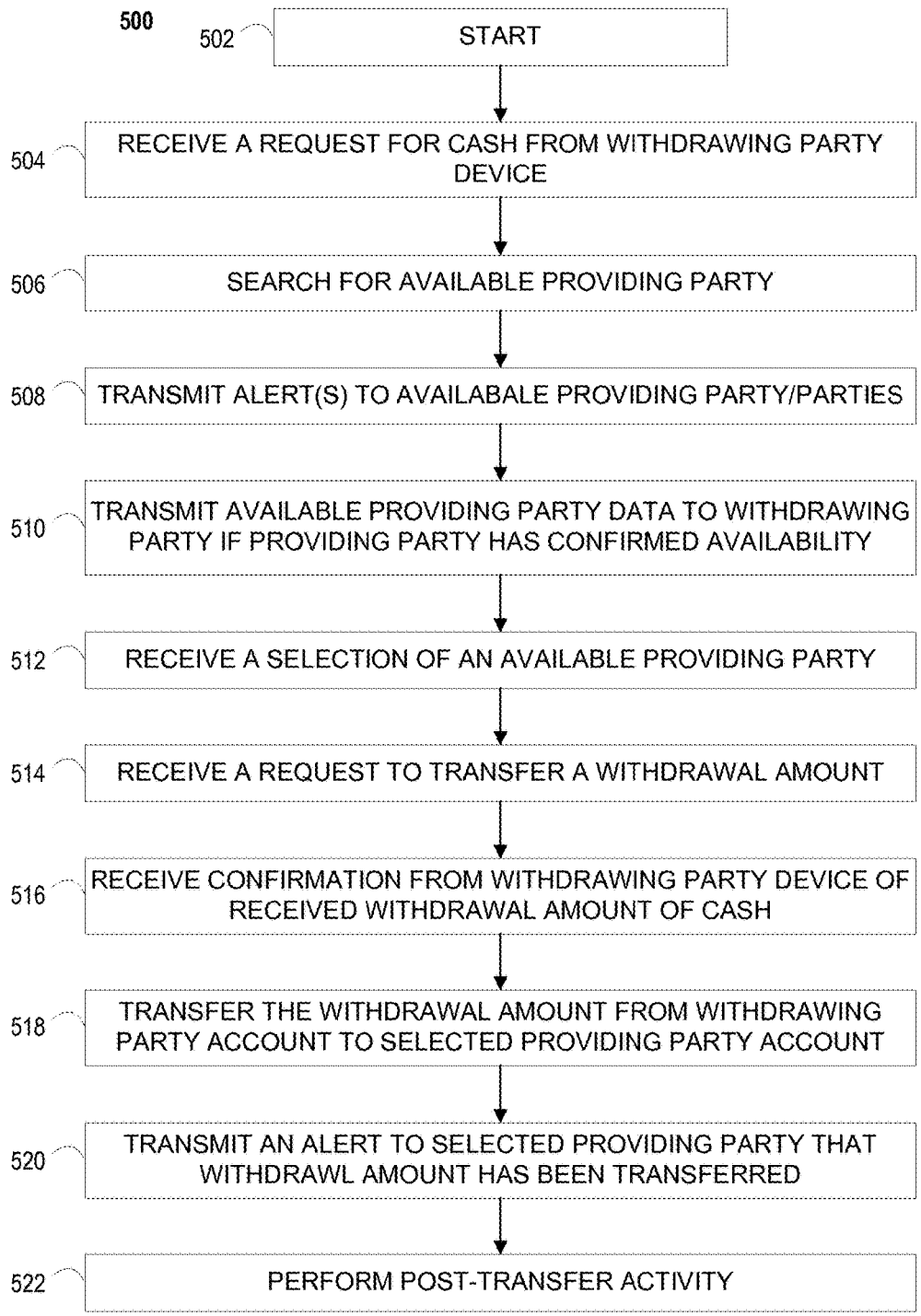
FIG. 5 is a flowchart illustrating an example method for providing a cash withdrawal using a social networking platform, consistent with various embodiments.

FIG. 5 depicts an example method performed using, for example, the systems described in FIGS. 1 through 4. The method may begin at block 502. At block 504, a withdrawal system, which may be similar to withdrawal system 140, may receive a request from a withdrawing party device to search for available providing parties according to the withdrawing party preferences and with drawing party security preferences. A request may include withdrawing party identification data, withdrawing party location data, withdrawing party preferences, and/or a withdrawal amount.

Withdrawing party preferences may include, for example, distance preferences (e.g., distance from withdrawing party device to providing party device, time to travel from withdrawing party device to providing party device based on a mode of transportation, and the like), merchant type (e.g., a type of merchant to be the providing party such as a clothing retailer, an electronics retailer, and the like; and/or a specific merchant name to be the providing party, a size of merchant in terms of a number of employees, retail locations, and the like), and/or a discovery preference (e.g., a rating indicating the withdrawing party's preference to discover new merchants). Withdrawing party security preferences may include, for example, data indicating a minimal providing party rating, a minimum number of withdrawals taken place with a providing party, and the like.

In block 506, a withdrawal system may perform a search for an available providing party using the withdrawing party preferences and security preferences as well as providing party security preferences. Providing party security preferences may include, for example, withdrawal limits for withdrawing parties, withdrawing party ratings (e.g., a credit rating, a rating indicative of a providing party's rating of the withdrawing party which may then be compiled and averaged, and the like), and the like. By way of example a search may be performed by comparing the withdrawing party location to a providing party location to determine if the providing party location with within the preferred distance determined by withdrawing party preferences. Other factors may be compared to determine whether a providing party may be considered an available providing party such as, for example, the providing party merchant type and the withdrawing party preferred merchant type, the providing party merchant name and the withdrawing party preferred merchant name, the providing party rating and the withdrawing party minimum preferred rating, and the like.

Once all withdrawing party preferences and withdrawing party security preferences have been compared to providing party data; and all providing party security preferences have been compared to the withdrawing party request, a withdrawal system may transmit an alert to each available providing party (block 508). The alert may include a request to confirm that the available providing party is willing and able to participate in a withdrawal with the withdrawing party. The request may include, for example, withdrawing party identification data, a withdrawal amount, and/or a distance from withdrawing party. The withdrawal system may then receive a response from an available providing party confirming participation as an available providing party.

At block 510, the withdrawal system may transmit available providing party data to a withdrawing party device, where the available providing party has confirmed participation. The providing party data may be transmitted in a list format and/or a map format. The providing party data may include data received via third parties, such as third party 160, including social networking data such as data received from Facebook, Twitter, Instagram, and the like; social rating data, such as data received from Yelp, Google+, and the like; mapping data, such as data received from Google Maps, Apple Maps, Waze, and the like; and/or other third party data. This third party data may be received at the withdrawal system from a third party system via an API.

At block 512, the withdrawing system may receive a selection from a withdrawing party device indicating that the withdrawing party would like to proceed with a withdrawal at a specific available providing party. The withdrawal system may transmit an alert to the providing party system indicating that the withdrawing party has confirmed the withdrawal and will be arriving at the providing party location. This confirmation alert may include withdrawing party data such as picture data, travel data, and the like. Picture data and/or travel data may be received via third party systems and relayed from the withdrawal system to the providing party system (or sent via an API to directly to the providing party system).

A providing party system also may utilize location-based technologies to receive an alert when a withdrawing party arrives within a threshold distance of providing party system. For example, location-based technologies may include utilizing GPS, multilateration of radio signals, network-based location data, device-based technology, Subscriber Identity Module ("SIM")-based data, crowdsourced WiFi data, indoor proximity systems, and/or any combination of the above. Location-based technologies may deliver alerts to providing parties when a withdrawing party device is within a threshold distance of the providing party location. Network-based location data may include location data associated with network infrastructure used by a device (e.g., withdrawing party device, providing party device). Device-based technology may include software stored on a device that determines a device location by providing device identification data, signal strength data, IP address data, and the like that may be transmitted to the carrier. SIM-based data may include raw radio measurements including the serving Cell ID, round-trip time, and signal strength. WiFi data, such as crowdsourced WiFi data may include location fingerprinting data, network ID data, signal strength data, and the like. Indoor proximity systems may include devices using Bluetooth technology to communicate with a Bluetooth-enable device when the device is in close proximity to the indoor proximity system. An example of an indoor proximity system may be, for example, an iBeacon.

A withdrawing party also may utilize location based technologies. For example, location based technologies may provide location data used to determine available providing parties, provide directions to providing parties, and the like. Network-based location data may include location data associated with network infrastructure used by a device (e.g., withdrawing party device, providing party device). Device-based technology may include software stored on a device that determines a device location by providing device identification data, signal strength data, IP address data, and the like that may be transmitted to the carrier. SIM-based data may include raw radio measurements including the serving Cell ID, round-trip time, and signal strength. WiFi data, such as crowdsourced WiFi data may include location fingerprinting data, network ID data, signal strength data, and the like. Indoor proximity systems may include devices using Bluetooth technology to communicate with a Bluetooth-enable device when the device is in close proximity to the indoor proximity system. An example of an indoor proximity system may be, for example, an iBeacon.

When a withdrawing party arrives at a providing party location, the providing party system and/or withdrawing party system may transmit a request to the withdrawal system to transfer a withdrawal amount from an account associated with a withdrawing party to an account associated with a providing party (block 514). The withdrawal system may transmit the request via an API to the financial institution(s) associated with the withdrawing party account and the providing party account. In another example, the withdrawal system is internal to a financial institution housing accounts for both the withdrawing party and the providing party and the request is routed internally.

At block 516, the withdrawal system may receive confirmation from the withdrawing party device that the withdrawing party has received the withdrawal amount in cash from the providing party. Upon receiving this confirmation, the withdrawal system may transmit confirmation to perform the transfer and/or may perform the transfer of the withdrawal amount from an account associated with the withdrawing party to an account associated with the providing party (block 518).

At block 520, the withdrawal system may transmit an alert to the providing party system that the withdrawal amount has been transferred into an account associated with providing party. At block 522, the withdrawal system may transmit a number of post-transfer activity options to a withdrawing party device and/or providing party system. For example, the withdrawing party may rate the providing party, the providing party may rate the withdrawing party, the withdrawing party may want to electronically share data regarding a newly discovered merchant (i.e., the providing party), and the like. Should the withdrawing party and/or the providing party desire to perform any post-transfer activities, the withdrawal system may receive a request to perform an activity and may direct the party to a third-party system or may receive input regarding the activity and transmit the input to a third-party system via an API.

Figure 6:
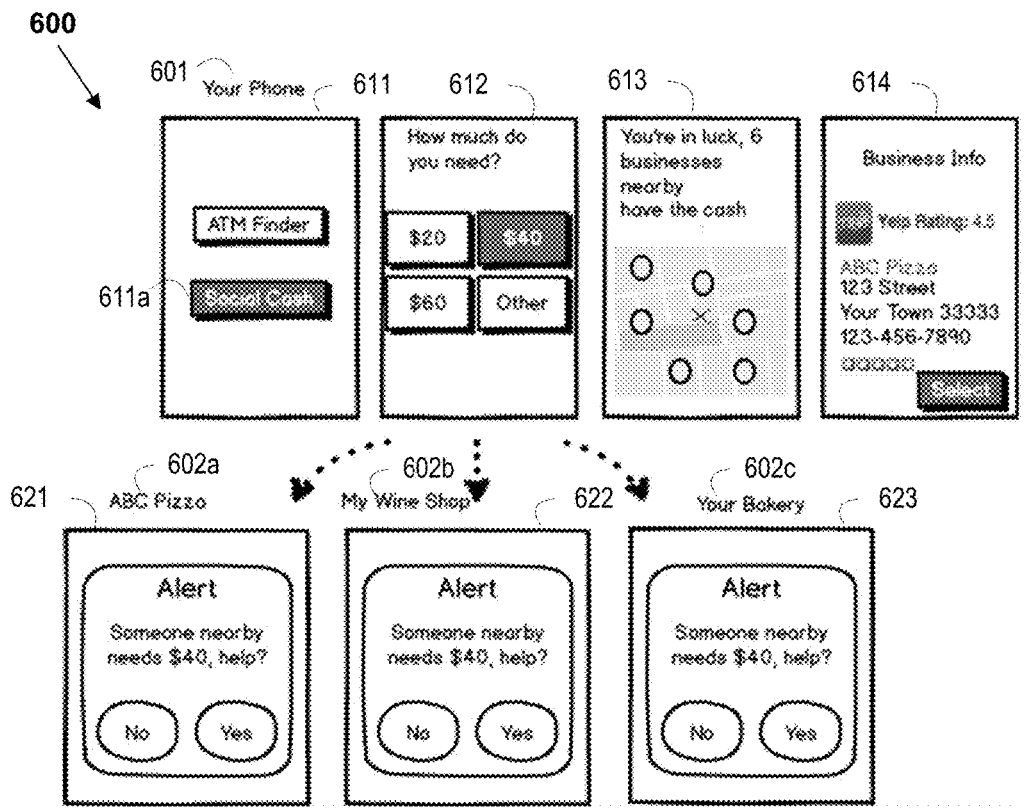
FIG. 6 is a user interface flow illustrating an example system, method, and interface for providing a cash withdrawal using a social networking platform, consistent with various embodiments.
Figure 7:
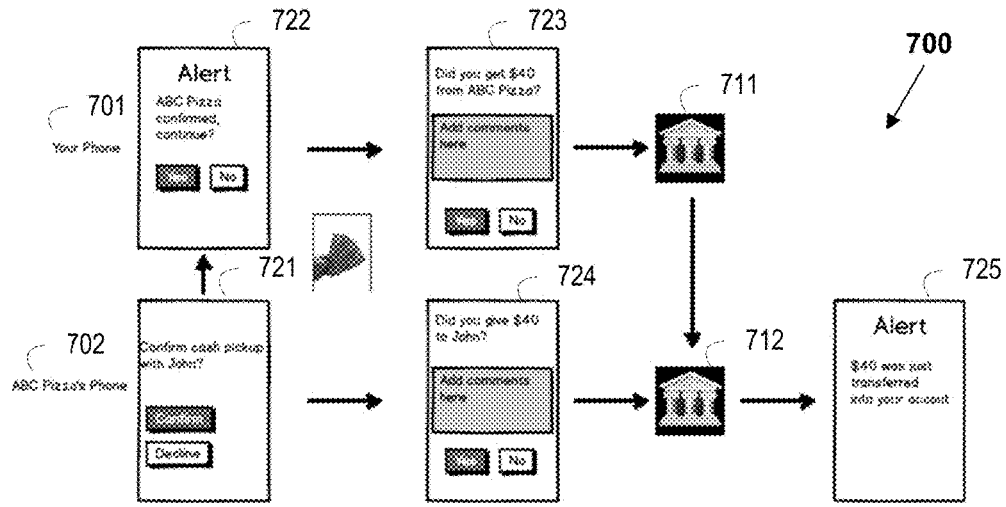
FIG. 7 is a user interface flow illustrating an example system, method, and interface for providing a cash withdrawal using a social networking platform, consistent with various embodiments.

FIGS. 6 and 7 illustrate screenshot flows of an example system, method, and interface for providing a cash withdrawal using a social networking platform, consistent with various embodiments. FIG. 6 illustrates an example screenshot flow 600 of a withdrawing device (e.g., Your Phone 601) and a providing party system (e.g., ABC Pizza 602*a*, My Wine Shop 602*b*, Your Bakery 602*c*). Additionally, FIG. 6 illustrates a mapping tool 613 provided on a withdrawing party device to illustrate available providing parties as well as rating information obtained via a third party system. When a withdrawing party wants to make a request for cash withdrawal, the withdrawing party may be presented with an interface 611. Interface 611 may be part of, for example, a native mobile application (e.g., a mobile banking application) and/or a mobile optimized website executing on a withdrawing party user device. If the withdrawing party selects "social cash" 611*a*, interface 612 may prompt withdrawing party to input and/or select the amount of cash requested.

Once the withdrawing party has inputted an amount, a request may be transmitted 631 to providing party systems. Providing party systems may receive an alert 621, 622, 623 informing a potential providing party that a withdrawing party is requesting cash. If a providing party accepts the request and agrees to provide the requested cash, withdrawing party may be presented interface 613 which informs withdrawing party that cash is available. Withdrawing party may then review information about a providing party via interface 614.

FIG. 7 illustrates an example screenshot flow 700 of a withdrawing device (e.g., Your Phone 701) and a providing party system (e.g., ABC Pizza 702), as well as a flow of transfer from one financial account associated with the withdrawing party 711 to another financial account associated with the providing party 712. When a withdrawing party arrives to receive the requested cash, the providing party system may input a confirmation into interface 721 which may cause transmission of interface 722 to withdrawing party user device which will alert withdrawing party that the providing party has confirmed providing cash. Withdrawing party may then be presented with interface 723 which prompts withdrawing party to confirm it received the cash. Providing party also may be prompted via interface 724 to confirm that it provided the cash. Withdrawing party may then cause transfer of the amount from its financial institution 712 to a providing party financial institution 712. Interface 725 may alert providing party that the money was transferred.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It may be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It may be further understood by those within the art that if a specific number of an introduced claim recitation is intended, such an intent may be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" may be understood to include the possibilities of "A" or "B" or "A and B."

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:
1. A method comprising:
maintaining, in a data storage associated with a withdrawal system, withdrawing party data comprising withdrawer financial account information and providing party data comprising providing party location data;
receiving, via a communication interface, a withdrawal request from a withdrawing party device, the withdrawal request comprising withdrawing party location data and a withdrawal amount;
receiving, via the communication interface, a withdrawing party security preference from the withdrawing party device, the withdrawing party security preference comprising a threshold distance between the withdrawing party device and one or more providing party devices stored in the data storage;
receiving, via the communication interface, providing party security preferences from the one or more providing party devices, the providing party security preferences comprising a withdrawal limit for the withdrawal amount;
identifying, via the withdrawal system, a subset of the one or more providing party devices that are within the threshold distance of the withdrawing party device and whose providing party security preferences comply with the withdrawal request;
transmitting, via the communication interface, an alert to each providing party device of the subset of the one or more providing party devices requesting a confirmation of available cash of at least the withdrawal amount;
receiving, via the communication interface, the confirmation from one or more available providing party devices;
receiving, via the communication interface, available providing party data from a third-party system, the available providing party data comprising information about available providing parties associated with the one or more available providing party devices;
providing, via the communication interface, the available providing party data for display on a user interface of the withdrawing party device;
receiving, via the communication interface, a selection from the withdrawing party device of a first available party of the one or more available providing party devices in which to complete a cash transfer;
receiving, via the communication interface, acceptance of the cash transfer of the withdrawal amount between the first available providing party device and the withdrawing party device; and
transferring an amount equal to the withdrawal amount from a withdrawer financial account to a provider financial account, wherein the withdrawer financial account is associated with a user of the withdrawing party device, and wherein the provider financial account is associated with the first available providing party device.

2. The method of claim 1, wherein the withdrawing party device is a mobile device executing a native application that transmits the withdrawal request.

3. The method of claim 2, wherein the mobile device uses location-based technologies to generate the withdrawing party location data.

4. The method of claim 1, further comprising:
analyzing, via the withdrawal system, the providing party security preferences to determine whether the withdrawal request complies with the providing party security preferences.

5. The method of claim 1, wherein the providing party security preferences include at least one of a withdrawal limit for the withdrawal amount or a rating for the user associated with the withdrawing party device.

6. The method of claim 1, wherein the withdrawing party security preference further comprises at least one of:
   a time to travel from the withdrawing party device to the one or more providing party devices, wherein the time to travel is determined based on the providing party location data and the withdrawing party location data; or
   a merchant type for the one or more providing party devices.

7. The method of claim 1, wherein the one or more available providing party devices comprise a point of sale device.

8. The method of claim 1, wherein the withdrawing party location data is generated using an indoor proximity system associated with the withdrawing party device;
   wherein the indoor proximity system comprises one or more wireless-enabled devices connecting the withdrawing party device to the one or more providing party devices; and
   wherein the one or more providing party devices are within the threshold distance of the withdrawing party device.

9. The method of claim 1, wherein the available providing party data comprises location data for the one or more available providing party devices.

10. The method of claim 1, wherein receiving the acceptance of the cash transfer comprises receiving, via the communication interface, an approval of the first available providing party device from the withdrawing party device.

11. The method of claim 1, further comprising:
    transmitting, via the communication interface, customer information associated with the user of the withdrawing party device to the one or more available providing party devices, the customer information including at least one of:
      a time to travel from a current location associated the withdrawing party device to a location associated with the one or more available providing party devices; or
      photographic data associated with the user of the withdrawing party device.

12. The method of claim 1, further comprising:
    transmitting, via the communication interface, a request to the withdrawing party device for a rating of a first available providing party associated with the first available providing party device; and
    receiving, via the communication interface, the rating for the first available providing party.

13. The method of claim 1, further comprising:
    transmitting, via the communication interface, a request to the first available providing party device for a rating for the user of the withdrawing party device; and
    receiving, via the communication interface, the rating for the user.

14. The method of claim 1, further comprising:
    receiving, via the communication interface, a request from the withdrawing party device to add new providing party data associated with a new providing party to the data storage.

\* \* \* \* \*